US008626840B2

(12) United States Patent
Maoz

(10) Patent No.: US 8,626,840 B2
(45) Date of Patent: Jan. 7, 2014

(54) METHOD AND SYSTEM FOR GENERATING A REFERENCING SECONDARY ELECTRONIC MAIL MESSAGE FROM A PRIMARY ELECTRONIC MAIL MESSAGE

(75) Inventor: Gadi Maoz, Kochav-Yair (IL)

(73) Assignee: Comverse Ltd., Tel Aviv (IL)

( * ) Notice: Subject to any disclaimer, the term of this patent is extended or adjusted under 35 U.S.C. 154(b) by 991 days.

(21) Appl. No.: 11/655,225

(22) Filed: Jan. 19, 2007

(65) Prior Publication Data

US 2008/0120385 A1 May 22, 2008

Related U.S. Application Data

(60) Provisional application No. 60/859,495, filed on Nov. 17, 2006.

(51) Int. Cl.
*G06F 15/16* (2006.01)
(52) U.S. Cl.
USPC .......... 709/206; 709/220; 700/225; 455/412.1
(58) Field of Classification Search
USPC ................. 709/206, 221; 700/225; 455/412.1
See application file for complete search history.

(56) References Cited

U.S. PATENT DOCUMENTS

| 5,436,960 | A  | * | 7/1995  | Campana et al. ......... | 455/412.1 |
| 6,084,919 | A  | * | 7/2000  | Kleider et al. ........... | 375/285 |
| 7,003,376 | B2 | * | 2/2006  | Witmond et al. .......... | 700/225 |
| 2003/0149733 | A1 | * | 8/2003 | Capiel ...................... | 709/206 |
| 2005/0198166 | A1 | * | 9/2005 | Kawaji ...................... | 709/206 |
| 2006/0031309 | A1 | * | 2/2006 | Luoffo et al. ............. | 709/206 |
| 2006/0218234 | A1 | * | 9/2006 | Deng et al. ................ | 709/206 |
| 2006/0224679 | A1 | * | 10/2006 | Kikuchi et al. ........... | 709/206 |

FOREIGN PATENT DOCUMENTS

| JP | 2005-284955 A | 10/2005 |
| WO | 01/78334 A2 | 10/2001 |
| WO | 2006/036042 A1 | 4/2006 |

OTHER PUBLICATIONS

Push e-mail—Wikipedia, the free encyclopedia; Oct. 30, 2006.
Emailing in a nutshell—a one page course on email protocols; Jun. 2002.
"Standard for the Format of ARPA Internet Text Messages", revised by David H. Crocker; Dept. of Electrical Engineering, University of Delaware, Newark, DE, RFC # 822, Obsoletes: RFC #733 (NIC #41952); Aug. 13, 1982.
Requirement for Internet Hosts—Application and Support, Internet Engineering Task Force, R. Braden, Editor, RFC1123; Oct. 1989.

(Continued)

*Primary Examiner* — Tammy Nguyen
(74) *Attorney, Agent, or Firm* — Ohlandt, Greeley, Ruggiero & Perle, L.L.P.

(57) ABSTRACT

In a method and system for generating a referencing secondary electronic mail message from a primary electronic mail message, a reference to accompanying data in the primary electronic mail message is obtained that allows reconstitution of the accompanying data from the reference. The referencing secondary electronic mail message is composed with the reference embedded therein instead of the accompanying data. Conversely, a non-referencing electronic mail message is reconstituted from a referencing electronic mail message that includes at least one reference indicative of respective accompanying data by accessing a copy of the respective accompanying data pertaining to each reference in the referencing electronic mail message. The referencing electronic mail message is augmented with the respective copy of the accompanying data relating to each reference.

8 Claims, 8 Drawing Sheets

(56) References Cited

OTHER PUBLICATIONS

"Multipurpose Internet Mail Extensions (MIME) Part One: Format of Internet Message Bodies"; Network Working Group, RFC 2045 Obsoletes: 1521, 1522, 1590; N. Freed, Innosoft, N. Borenstein, First Virtual, Nov. 1996.

"Multipurpose Internet Mail Extensions (MIME) Part Two: Media Types"; Network Working Group, RFC 2046 Obsoletes: 1521, 1522, 1590; N. Freed, Innosoft, N. Borenstein, First Virtual, Nov. 1996.

"MIME (Multipurpose Internet Mail Extensions) Part Three: Message Header Extensions for Non-ASCII Text"; Network Working Group; K. Moore, University of Tennessee, RFC 2047, Obsoletes: 1521, 1522, 1590, Nov. 1996.

"Multipurpose Internet Mail Extensions (MIME) Part Four: Registration Procedures"; Network Working Group; N. Freed, Sun Microsystems, J. Klensin, RFC 4289, Obsoletes: 2048; Dec. 2005.

"Multipurpose Internet Mail Extensions (MIME) Part Five: Conformance Criteria and Examples"; Network Working Group; N. Freed, Innosoft, N. Borenstein, First Virtual; RfC 2049; Obsoletes: 1521, 1522, 1590; Nov. 1996.

"Media Type Specifications and Registration Procedures"; Network Working Group; N. Freed, Sun Microsystems, J. Klensin; RFC 4288, Obsoletes: 2048; Dec. 2005.

\* cited by examiner

From: B <B@Second.Address>
To: C <C@Third.Address>
Subject: FW: Watch this film ...

Hi C,
I have received a wonderful film from A.
He took it during his visit at our home,
do you remember?
See below,
Miss you,
B
-------- Original Message --------
From: A <A@First.Address>
Sent: Saturday, January 01, 2028, 2:54 PM
To: B <B@Second.Address>
Subject: Watch this film ...

Dear B,
Watch the enclosed film. I took
it during our visit at your home.
Love,
A.     <reference to 305>

From: B <B@Second.Address>
To: C <C@Third.Address>
Subject: FW: Watch this film ...

Hi C,
I have received a wonderful
film from A. He took it
during his visit at our home,
do you remember?
See below,
Miss you,
B
------ Original Message ------
<reference to 301>

311
313

METHOD AND SYSTEM FOR GENERATING A REFERENCING SECONDARY ELECTRONIC MAIL MESSAGE FROM A PRIMARY ELECTRONIC MAIL MESSAGE

CROSS-REFERENCE TO RELATED APPLICATIONS

This application claims the benefit of U.S. Provisional Patent Application No. 60/859,495, titled "Method and System for Reducing Bandwidth Used While Conveying Electronic Mail Messages" and filed on Nov. 17, 2006, the disclosure of which is incorporated by reference in its entirety.

BACKGROUND OF THE INVENTION

1. Field of the Invention

This invention relates to electronic mail. More specifically, the invention relates to reducing bandwidth used while conveying electronic mail messages.

2. Description of the Background Art

Electronic mail, commonly known as "email," is a set of mechanisms designed to allow computer users to send messages (constituting "email messages," "mail messages," or more concisely just "messages") to one another. Hereinafter, throughout the present specification, the term "message" means "email message", unless specifically noted.

It is known in the art that email includes Internet email, but it is not limited thereto. There may be other types of email used, such as proprietary email systems, LAN-based email packages, mainframe systems, and the X.400 set of messaging standards (officially named ISO/IEC 10021) basically developed by ISO (International Organization for Standardization) and ITU (International Telecommunications Union).

The primary element of email is the message. It is known that every message consists of a header and a body, wherein the header contains various pieces of information about the message (such as "from," "to," "subject," "date," etc.) and the body contains the information that the sender wants to communicate. However, the header and body are non-limiting constituents of a message. Sometimes a message is described also as consisting of an envelope, wherein the envelope can specify the source (sender) and destination (recipient) of the message.

The message body basically includes free-form text data, i.e., plain text. However, while the usage of email has grown as a communication medium, people eventually wanted to send data other than plain text, such as attached files, multimedia content, formatting, etc.

A message is transmitted and routed by the aid of several tasks. Mail Transport Agents (MTAs) are responsible for routing messages. MTAs receive messages from various sources and decide where and how each message should be routed. Once an MTA has received a message, processed it, and decided where to route it, it conveys the message to a Mail Delivery Agent (MDA), which is responsible for delivering the message to another location, e.g., another MTA, a user's inbox, or a program that performs a special task.

While MTAs and MDAs are responsible for routing and transporting email messages, Mail User Agents (MUAs) are responsible for providing an interface for users to manage their mails, including viewing messages, managing mail folders, composing new mail messages, sending messages, replying to messages, forwarding messages, etc. In the early days of email the MUA typically resided on the same machine where a user received his email messages. Later on, two protocols, POP (Post Office Protocol) and IMAP (Internet Message Access Protocol), were created, thus allowing use of an MUA to read email that resides on remote machines. POP provides a protocol for MUAs to download the user's inbox from a remote mail server. IMAP provides a protocol for MUAs to manipulate mail folders on a remote mail server.

The operation of email is defined in standards. The standards are defined in a set of RCFs (Request For Comments), which define the various protocols and formats necessary to make email work across the Internet. For example, RFC822 (Standard for the Format of ARPA Internet Text Messages), published in 1982, is a Standard defining Internet email messages. RFC822 defines how email messages need to be formatted when being transmitted from host to host, thus providing a normalized format for email messages, so that different types of networks can transfer email from one to another. RFC822 does not define the format of stored email. For example, RFC822 describes that a message consists of header fields and, optionally, a body. The body is simply a sequence of lines containing ASCII characters. It is separated from the header by a null line (i.e., a line with nothing preceding the CR, Carriage Return character, followed by an LF, Line Feed character). Each header field can be viewed as a single, logical line of ASCII characters, comprising a field-name and a field-body. Standard RFC822 header fields include, for example, "From," "Sender," Reply-To," "To," "Cc," "Bcc," "Message-ID," "In-Reply-To," "References," "Date," "Received," "Return-Path," "Subject," "Comments," etc.

RCF1123 (*Requirements for Internet Hosts—Application and Support*), published in 1989, is another standard. It incorporates, amends, corrects, and supplements the primary protocol standards documents relating to hosts. Specifically, chapter 5 thereof is directed to email and RFC822.

It is noted that pure RFC822 message bodies are merely a series of text lines, which have no additional structure or meaning imposed on them. Because additional structure is sometimes desirable (including additional information such as attachments), several other conventions and standards have evolved over the years, outside the scope of the message format standard. For example, because the RFC822 message is limited to US-ASCII, pure RFC822 messages were limited thereby and could not include other characters used in non-English languages. Someone named André, for example, is not able to spell his name correctly in a pure RFC822 email message. In addition, RFC822 has no way to identify the structure of the data in stored in the message body. If a sender sends a message containing, for example, an HTML (Hyper-Text Markup Language) file, it is up to the recipient to notice that the data can be viewed by an HTML browser. It is appreciated that if the format of the data had been identified in the message, the MUA could have taken steps necessary to present the data in a proper way. Furthermore, because RFC822 messages are text-based, MUAs need a way to identify non-text data (such as binary data) in order to handle it properly. MIME provides a way to deal with these limitations.

RFC2045 (*MIME Part One: Format of Internet Message Bodies*), RFC2046 (*MIME Part Two: Media Types*), RFC2047 (*MIME Part Three: Message Header Extensions for Non-ASCII Text*), and RFC 2049 (*MIME Part Five: Conformance* Criteria and Examples), all published in 1996, as well as RFC4288 (*Media Type Specifications and Registration Procedures*) and RFC4289 (*MIME Part Four: Registration Procedures*), both published in 2005, provide definition of the basic MIME standard.

The term "entity" or "MIME entity" refers to the MIME-defined header fields and contents of either a message or one of the parts in the body of a multipart entity. That is, an entity consists of the body of a message and the MIME-specific fields in the message header. The entity header contains fields used to describe the contents of the body, such as the type of data included in the body and the coded character set used in the data. MIME-specific header fields are generated by a sending MUA when a message is composed. A receiving MUA uses the MIME-specific header fields to decide how to extract any entities contained in a message.

The capacity of email communication has being growing over the years. This has affected communication network performance, as well as the performance of computers, e.g., computers where mail servers operate, where email messages are composed, and/or where email messages are received. Hence, efforts have been made to improve performance. For example, JP 2005-284955 ("Electronic Mail Transmitting/Receiving System", Fujioka Hideki, published October 2005) acknowledges the necessity to preserve CPU resources by preventing unnecessary mail transmittance. Hence, a mail transmitting server to which transmission of electronic mail is requested, temporarily stores text of the electronic mail in an external storage device and transmits only a mail ID, a sender, and a title of the case for identifying the mail. A mail recipient makes a request to receive the text of the mail from the mail transmitting server only for those electronic mail messages whose text he desires to read by himself. The mail receiving server acquires the text of the mail from the mail transmitting server in response to the request and sends the text to the mail recipient. Thus, the text of electronic mail is prevented from being unnecessarily transferred via a network.

WO 0178334 ("Methods and Systems for Composing and Transmitting Content-Rich Communications," Roberts et al., published on Oct. 18, 2001) describes methods, systems, and articles of manufacture that provide the ability for composing and transmitting a communication (such as an electronic mail message) using a content server within a communications network. The content associated with the communication is identified, typically by accessing it from storage or capturing it from peripheral devices. A location for the identified content is then determined within a layout for the body of the communication. The content is then streamed to a dynamic content server instead of being attached to the communication itself. When all of the content for the communication has been identified and streamed to the server, a minimal amount of information is transmitted to the intended recipient within the communication. This transmitted minimal amount of information includes an instruction set referencing the communication's content stored on the server.

Further to such methods for reducing email capacity, it is also known in the art how to track mail pieces. For example, U.S. Pat. No. 7,003,376 ("Method for tracking a mail piece," Witmond et al., issued on Feb. 21, 2006) discloses a system and method that include capturing an image of the mail piece, associating a tracking number for the mail piece with the image, providing the mail piece and tracking number to a carrier, and utilizing information from the image to investigate a lack of delivery, if no delivery verification is received from the carrier within a certain time period. The system and method may also include extracting information from a portion of the image and presenting the extracted information to a carrier, receiving additional information related to the mail piece from the carrier, providing the mail piece, the additional information, and a tracking number for the mail piece to a carrier, inserting the mail piece into a mail stream, and then utilizing information from the image to investigate a lack of delivery if no delivery verification is received from the carrier within a certain time period.

Furthermore, WO 2006036042 ("Method and System for Providing Permanent Mail Service," Ahn Jung Eun et al., published on Apr. 6, 2006), for example, discloses a method and system for storing mail permanently without restriction of storage space of mailbox. When a user makes a request to store certain mail permanently, a mail server transforms the requested mail data into permanent mail data with a predetermined format. The transformed mail data is transmitted to an external server that provides personal information storage space. The external server stores received permanent mail data on corresponding user area. If the user makes a request to read the permanent mail data, the mail server requests the requested permanent mail data from the external server, and the external server transmits the requested permanent mail data to the mail server, enabling users to read mails indicated as permanent mail regardless of the capacity of the mailbox.

It should be appreciated that traditional email systems are "pull" based, i.e., the MUA (email reader) polls the MDA (the mail server) to see if there is new mail, and if so downloads it to a mailbox in the user's home directory. Yet, mail messages have been pushed, that is, actively transferred from the origin to the destination MDA. In email systems that are "push" based, the pushing of messages pushing is extended, while messages are pushed also to the MUA (the email reader, or client). Push based email systems are adapted, for example, for devices that are "always on", such as RIM's BlackBerry® (Research In Motion Ltd. Corp., Waterloo, Ontario, Canada) devices that are connected via a wireless network. RIM's BlackBerry service uses wireless MUAs which are the BlackBerry devices, and a BlackBerry Enterprise Server (BES), which is a gateway attached to a traditional e-mail system. The BES monitors the e-mail server, and upon detecting a new mail message for a BlackBerry user, it retrieves (pulls) a copy thereof and pushes it to the BlackBerry handheld device over the wireless network.

A push based email system is described, for example, in U.S. Pat. No. 5,436,960 ("Electronic Mail System with RF Communications to Mobile Processors and Method of Operation Thereof," Campana Jr. et al., issued on Jul. 25, 1995), which discloses a system for transmitting originated information from one of a plurality of originating processors in an electronic mail system to at least one of a plurality of destination processors in the electronic mail system. The system includes a RF information transmission network for transmitting the originated information to at least one RF receiver which transfers the originated information to the at least one of the plurality of destination processors, at least one interface switch. The electronic mail system transmits other originated information within the electronic mail system through a telephone network.

SUMMARY OF THE INVENTION

In one exemplary embodiment, the present invention relates to a method for generating a referencing secondary electronic mail message from a primary electronic mail message. The method includes obtaining the primary electronic mail message and obtaining a reference to accompanying data in the primary electronic mail message that allows reconstitution of the accompanying data from the reference. The method further includes composing the referencing secondary electronic mail message with the reference embedded therein instead of the accompanying data.

In another exemplary embodiment, the invention relates to a method for reconstituting a non-referencing electronic mail message from a referencing electronic mail message that includes at least one reference indicative of respective accompanying data. The method includes accessing a copy of the respective accompanying data for each reference in the referencing electronic mail message. The non-referencing electronic mail message is reconstituted by augmenting the referencing electronic mail message with the respective copy of the accompanying data relating to each reference.

Other exemplary embodiments and advantages of the invention will be apparent from the following description and the appended claims.

DETAILED DESCRIPTION OF THE EXEMPLARY EMBODIMENTS

Figure 1A:
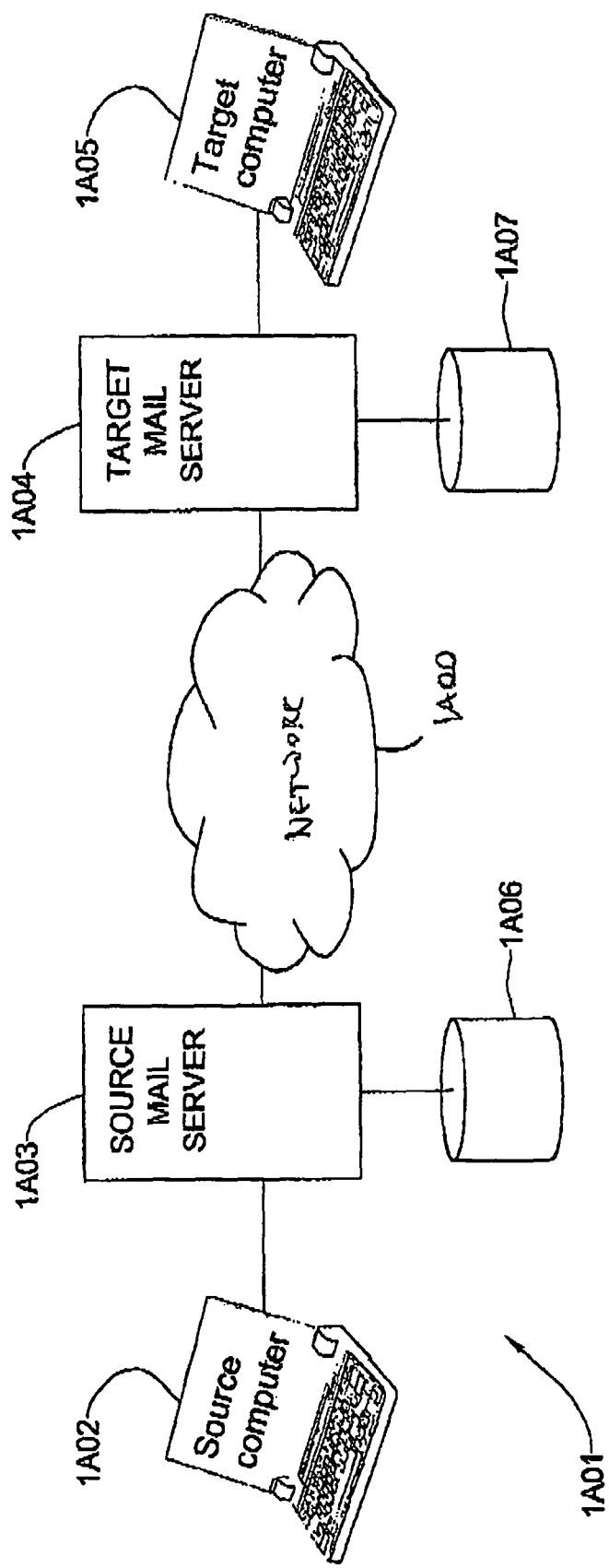
FIG. 1A is a schematic illustration of a system allowing delivery of electronic mail messages.

In the following description components that are common to more than one figure will be referenced by the same reference numerals.

FIG. 1A is a schematic illustration of a system 1A01 allowing delivery of electronic mail messages via a network depicted by a network cloud 1A00. An electronic mail message is composed on a computer 1A02, constituting a source computer. While sending the message it is transmitted to a computer 1A03, referred to as a "source mail server computer," or more concisely, "source mail server," wherein the source mail server transmits the message further to a target mail server computer 1A04, also referred shortly as a "target mail server." Upon or further to receiving the mail message, the target mail server transmits it to a target computer 1A05, where it is displayed.

Those having ordinary skill in the art will appreciate that the system 1A01 is a non-limiting example and there exist alternatives thereto, such as a source computer and a target computer that are coupled to the same mail server, whereby a single mail server can operate as the source mail server and the target mail server. In addition, it will be appreciated by those skilled in the art that an electronic mail message is normally composed by a sender and transmitted to a recipient. The sender and recipient can compose and read the message on any computer. In one alternative embodiment, the sender can login to a computer (i.e., the source computer), compose the message, send it to the recipient and logout. Then the recipient can login to the same computer or to any other computer (generally referred to as the target computer) and read the message. That is, according to this latter example the source computer and the target computer can be the same, hence, generally, the source computer is the computer to which the sender is logged in, while the recipient computer is the computer to which the recipient is logged in, without requiring that two different "physical" computers are concerned.

It will further be appreciated that the recipient is not necessarily logged into the system when the sender sends the electronic mail message thereto. Hence, the target mail server computer can store the message in an accessible storage device, such as the recipient's mailbox, allowing the recipient to view the message upon logging into the system from any target computer accessible thereto. Hence, the source mail server and the target mail server have storage devices accessible thereto, such as the storage devices 1A06 and 1A07, respectively.

Figure 1B:
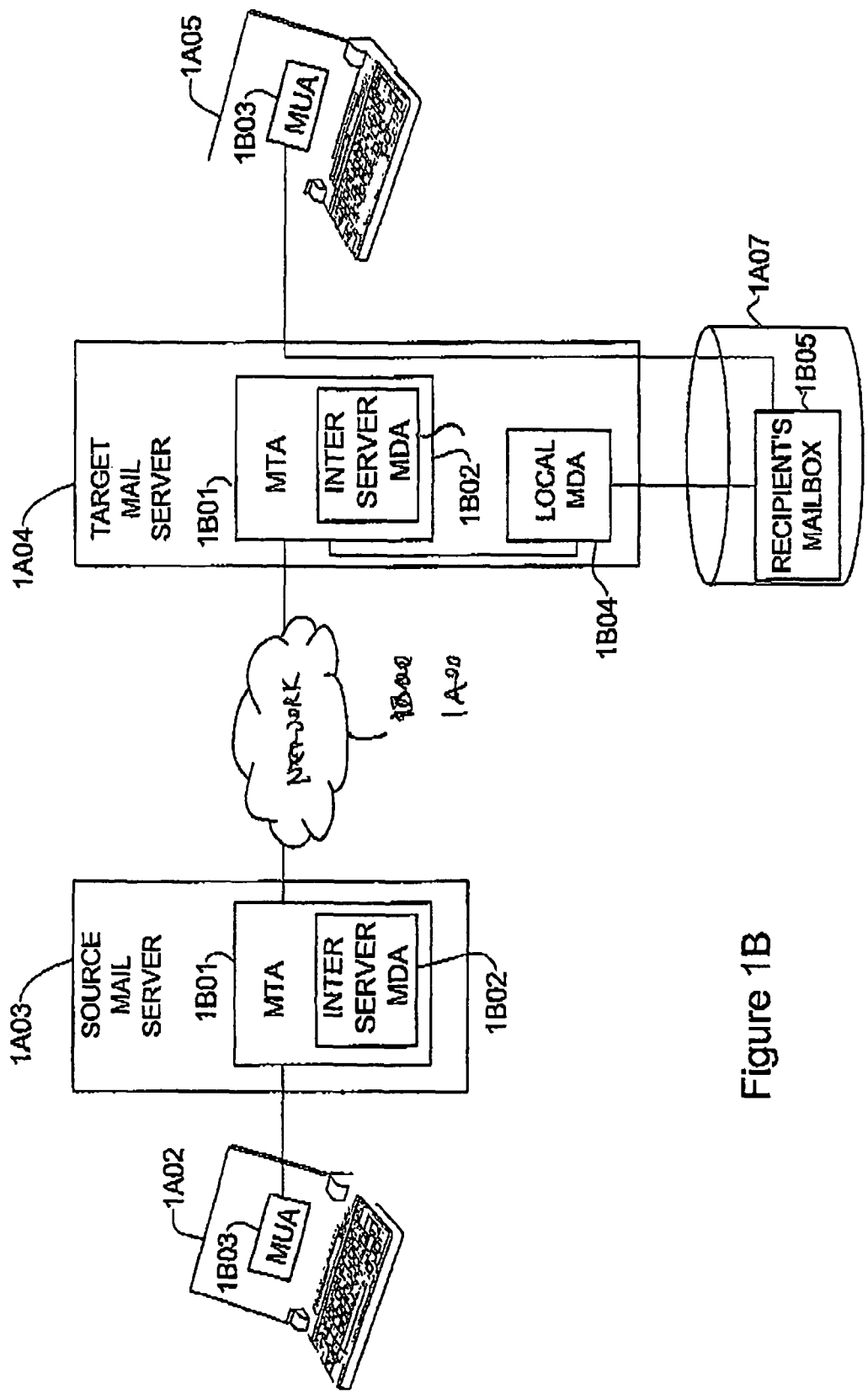
FIG. 1B schematically illustrates the system of FIG. 1A in greater detail.

FIG. 1B schematically illustrates the system of FIG. 1A in greater detail. It will be appreciated that the mail servers, i.e., the source and target mail servers 1A03 and 1A04 each operate a Mail Transport Agent (MTA) 1B01, that can be coupled with a Mail Delivery Agent (MDA) 1B02. In one embodiment, the source and target computers 1A02 and 1A05 may each operate a Mail User Agent (MUA) 1B03.

When the sender composes and sends an email message, the MUA 1B03 operating in the source computer 1A01 transmits the message to the MTA 1B01 operating in the source mail server computer 1A03. The MTA determines the routing scheme for the message and conveys the message to the MTA 1B01 coupled thereto in order for it to transmit it further in accordance with the determined scheme.

The network cloud 1B00 illustrated in the figure may include zero or more nodes relaying the message on its way from the source mail server computer 1A03 to the target mail server computer 1A04.

Upon receiving the message, the MTA 1B01 of the target mail server computer 1A04 identifies that the message is addressed to a receiver listed as a user thereof. The MTA passes the message to a local MDA 1B04, which stores the message in the recipient's mailbox 1B05. When the recipient logs into the system, running his MUA 1B03, he will access the stored message and read it.

Those having ordinary skill in the art will appreciate that variations of the illustrated system exist, and that the present invention is not limited to said system. For example, in one embodiment, instead of being internal to the MTA 1B01, the inter server MDA 1B02 can be external to the MTA 1B01. Alternatively, in another embodiment, instead of having two MDAs (1B02 and 1B04), a mail server computer can have a single MDA in charge of transmitting messages to other MTAs and for storing messages in mailboxes, and sometimes more than two MDAs may exist.

In the system shown in FIGS. 1A and 1B, the source mail server computer 1A03 does not include a local MDA 1B04. Those having ordinary skill in the art will appreciate that the source mail server computer 1A03 can include any module applicable to the case, such as a local MDA, and that the source mail server computer 1A03 can have access to mailboxes.

In some embodiments, the source and/or target computers (1A02 and 1A05) connect to their respective mail server computers in alternative ways. For example, it is possible to compose and/or read email messages from a web browser accessing the mail server via the Internet. It is also possible to access email services (i.e., connect to the respective mail server computer) via alternative ways such as via Personal Digital Assistants (PDAs), including wireless devices (e.g., RIM's BlackBerry® wireless platform), mobile phones capable of sending and receiving emails, and also via different non-visual interfaces. Non-limiting examples of non-visual interfaces include an email reader that performs text-to-speech conversion and vocally reads emailed documents to the user and an email dictation machine that performs speech-to-text conversion, vocally receives messages, and automatically converts them to text to be sent via email. Accordingly, the source and target computers (1A02 and 1A05) represent any device and/or tool that allows access to email services, and they are not restricted to computers known per se, such as PCs (Personal Computers) and workstations. Further, the source and target computers are not required to be of the same type. The source computer can be, for example, a wireless device, while the target computer can be a web browser allowing access to email services. Therefore, instead of using the term "source computer" and "target computer", the general terms "source node" and "target node" will be used hereinafter.

It is known that sometimes, when connecting a node to a network, the communication path downstream of the node is not equal in capacity to that upstream of the node. This is the case in Asymmetric Digital Subscriber Line (ADSL), for example, wherein the downstream rate is higher than the provided upstream rate. If the source node, for example, is connected to the network via any ADSL, then it will be appreciated that downloading a message whose size is significant will be faster than sending such a message. Hence, transmitting an email message that includes a large attachment, for example, can be severely slower than receiving an identical message.

Those skilled in the art will appreciate that further to sending a message (constituting a "primary message" or a "primary electronic mail message") from a sender (constituting a "primary sender") to a recipient (constituting a "primary recipient"), the primary recipient can forward copies of the primary message to one or more other recipients (hence constituting "secondary messages" or a "secondary electronic mail message"). In this case, the primary recipient is also a "secondary sender," and each recipient of the forwarded message may be considered as a "secondary recipient." It will also be appreciated that each one of the secondary recipients can forward copies of the message further. Thus, within very few such "generations," a single copy of the primary message can form the basis for many (x) copies of the same message (with or without modification). In addition, the primary message transmitted and forwarded in this latter example can include additional structure and/or information (such as attached files) and it is not composed, necessarily, solely of text. Hereinafter, "additional structure and/or information" is referred to also as "accompanying data" and it should be appreciated that the accompanying data is part of the primary message. It will be appreciated that in this case, a large amount of data can be copied again and again, x times. Even worse: upon receiving such a primary message that includes the accompanying data, i.e., upon downloading the primary message and the accompanying data and, when forwarding copies of the message toy other recipients, the recipient (who becomes a sender) has to upload the message y times, including the accompanying data, which is time consuming.

According to embodiments of the invention, instead of reducing data download, data upload is reduced. Bearing in mind that a received message can be forwarded many times, it is appreciated that reducing data upload is more significant than reducing data download. This significance is increased even further if the forwarding node is connected to the network via an asymmetric link.

Figure 2:
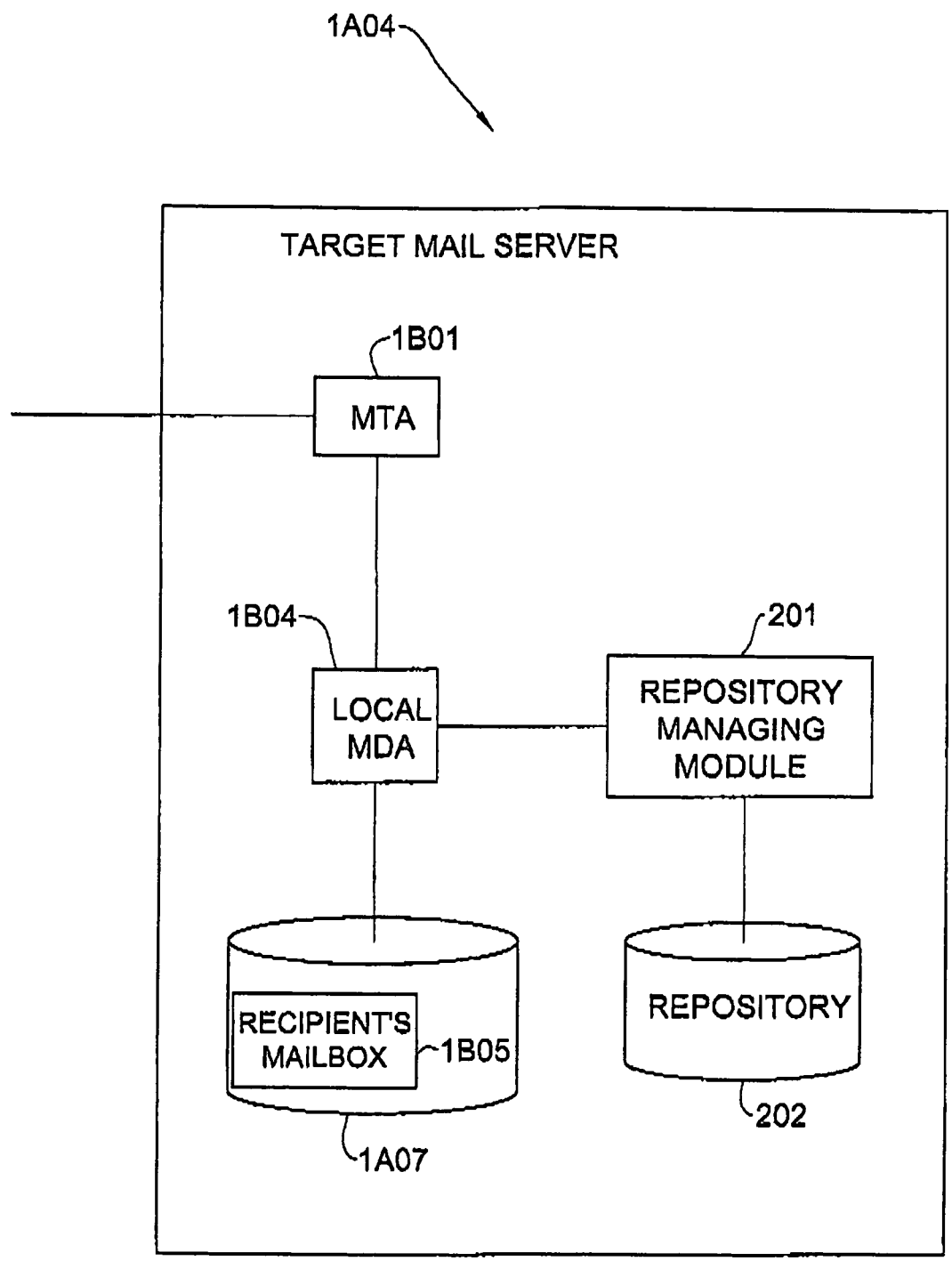
FIG. 2 is a schematic illustration of a target mail server computer adapted for reducing data upload in accordance with an exemplary embodiment of the invention.

FIG. 2 is a schematic illustration of a target mail server, such as 1A04 in FIGS. 1A and 1B, adapted for reducing data upload, in accordance with one embodiment of the invention. Apart from being coupled to the storage device 1A07 (and the recipient's mailbox 1B05), the local MDA 1B04 is coupled to a repository managing module 201, which in turn is coupled to a repository 202.

Upon receiving a message, the local MDA 1B04 stores the message in the recipient's mailbox 1B05 and conveys the message to the repository managing module 201. The repository managing module 201 analyses the message and stores a copy thereof, including accompanying data, in the repository 202. In another embodiment, instead of storing in the repository a copy of the message, the managing module 201 can store in the repository 202 only accompanying data (if it exists in the message), in association with an identification of the message. In another embodiment, some mail servers can store copies of incoming messages, apart from storing the messages in the recipients' mailboxes. The mail server's repository in which the mail server stores copies of the incoming messages constitutes a "local repository." Thus, in such a mail server it may be possible to use the local repository instead of storing copies of the messages in the repository 202.

In one embodiment, instead of storing the message and/or accompanying data in the repository 202 upon receiving the message, the message may be conveyed to the managing module 201 upon reading the message. That is, when accessing a message stored in the recipient's mailbox 1B05 and conveying this message to the target node, it is possible to convey the message (or a copy thereof) also to the managing module 201.

As noted above in the Background, the message can be considered as a primary message. The recipient of the message can forward secondary messages, including a copy of the primary message, to other recipients. That is, a recipient of the primary message can send secondary messages corresponding to the primary message. Those skilled in the art will appreciate that in order to receive and/or send email, each one of the source and the target nodes normally has to be coupled to a respective mail server, while it is customary that a node is coupled to only one mail server, used for sending and for receiving email messages. Hence, it should be appreciated that the mail server used as the target mail server for receiving the primary message, can be used also as the source mail server for transmitting the secondary message. In this case it is possible to use the same MTA 1B01 for conveying the message to the local MDA 1B04 and to the inter server MDA 1B02. However, this is not mandatory and those skilled in the art will appreciate that two different MTAs can be used if applicable. For the sake of simplicity, the description that follows assumes that a single MTA is used, unless specifically noted otherwise.

Thus, it should be appreciated that the secondary message's source node conveys the secondary message to the respective mail server's MTA. Because, according to one embodiment of the invention, the MTA 1B01 is coupled to the repository managing module 201 and to the repository 202 (even if in an indirect manner, e.g., via the local MDA 1B04), the mail server can access a copy of the corresponding primary message stored in the repository if such a copy is stored therein. Hence, the target mail server can access also any accompanying data stored in association with the copy of the message. Thus, it should be appreciated that in the secondary message's source node it is possible to compose a secondary message that does not include a copy of any accompanying data being part of the primary message, thereby expediting the transmittal of the secondary message (or messages) from the secondary message's source node to the respective mail server. Upon receiving the secondary message in the mail server, a corresponding copy of the primary message is retrieved from the repository, if such a copy is available therein, and the primary message's associated additional structures and/or information (if this exists) can be added to the secondary message, as if they were added in the secondary message's source node, before conveying the secondary message to its respective mail server computer.

In those cases in which the mail server used for receiving the primary message is not the mail server used for sending the secondary message(s), it is noted that in order to allow the mail server used for sending the secondary message to retrieve the copy of the primary message from the repository 202, the repository 202 must be accessible thereto. Alternatively, it is possible to transmit the secondary message to the mail server hosting the repository 202 (i.e., the mail server used for receiving the primary message), in order to add the additional structures and/or information to the secondary message therein. Then, this mail server can act as if it is a mail client, forwarding the secondary message, which already includes the additional structures and/or information, to the mail server used for sending the secondary message(s).

For example, a sender A sends an email message, constituting a primary message, to a receiver B, attaching a file including a large video movie. The target mail server stores a copy of the primary message, in association with the video's file, in the repository. Then, upon receiving the primary message, B decides to forward it to C. Conventionally, B would generate a secondary message that includes a copy of the primary message, including the video file attachment. However, in contrast thereto, in one embodiment of the present invention, B can compose a secondary message omitting the video file therefrom and convey this secondary message to the mail server, in order to transmit it to C. In the mail server, the stored copy of the primary message is retrieved, allowing the video file to be copied therefrom and added to the forwarded secondary message. C therefore, will receive the secondary message with the attached video file, being unaware that B sent it without the attachment.

Hereinafter, the term "recycling" will be used to mean associating with a secondary message additional structures and/or information originally being part of a primary message. In the latter example the mail server recycles the video file; however it is not mandatory to recycle a file. According to a different example and embodiment, the complete content of a message can be recycled. Furthermore, although recycling is described as associating content being part of a primary message while transmitting a secondary message, it will be appreciated that content being part of a secondary message can be recycled when transmitting a tertiary message and so on. Hence, unless specifically noted otherwise, the term "primary message" is generally used hereinafter to refer to any original message whose content is recycled, while the term "secondary message" is generally used hereinafter to refer to any message into which the recycled content is embedded. Thus, reverting to the latter example, upon receiving from B the message, which includes the video file, C can further forward it to D. To this end, C considers the message from B as a primary message, and the message to D as a secondary message. It will be appreciated that this secondary message, according to an embodiment of the invention, need include only a reference to the primary message (or to the video file) instead of including the whole primary message. Such a secondary message will also be referred to as a "referencing message" as distinct from a message that is complete without reference to supplementary content and which will be referred to as a "non-referencing message." The mail server used for sending a referencing secondary message to D recycles the video file (or the complete primary message), and hence the message received by D includes the primary message and the video file.

FIGS. 3A-3D schematically illustrate examples of email messages in accordance with embodiments of the invention. FIGS. 3A and 3B depict a primary message 301 sent from A to B. The message 301 has a header 302 and a message body 303, which, according to the example, includes a text portion 304 and an attached video file named Film.AVI and designated 305. It is noted though that different embodiments exist, wherein the attached video file 305 can appear to be included in the header, instead of the message body, but for ease of description, inclusion in the message body is described.

306 is a secondary message, whereby B forwards the primary message to C, as presently known in the art. It is noted that like the primary message 301, the secondary message 306 also includes a header 307 and a message body 308. It should also be noted that the message body 308 includes new text 309 that B writes to C, in addition to a copy 310 of the original message from A to B, which includes the video file attachment 305.

Figure 3:
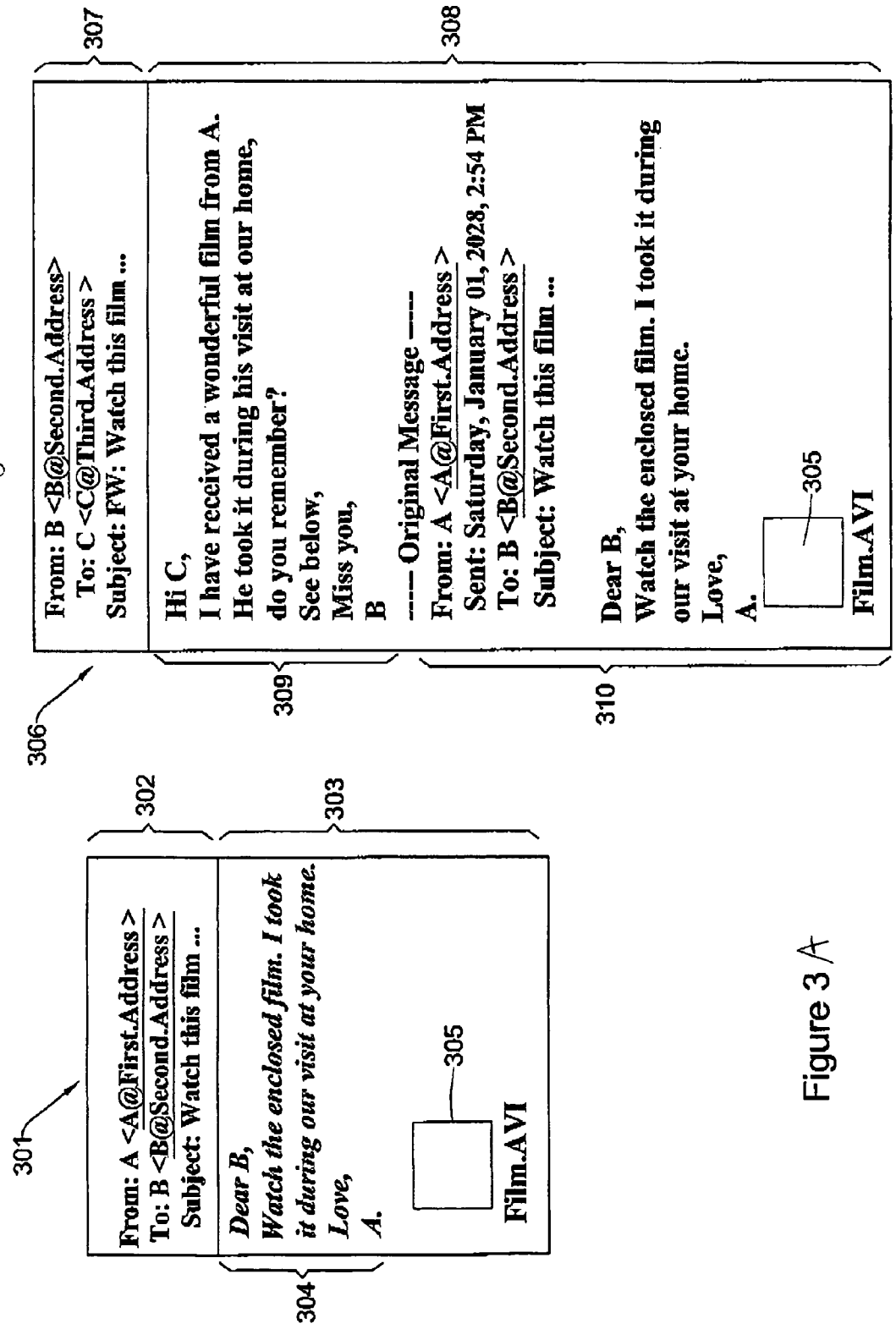
FIGS. 3A-3D are schematic illustrations of example email messages in accordance with exemplary embodiments of the invention.

FIG. 3C depicts an alternative secondary message 311 conveyed from B to C in accordance with another embodiment of the invention. The header 307 of this message 311 is similar to the header 307 of message 306, however, the message body 312 is shorter. Instead of including a copy of the original message 301 (shown as 310 in FIG. 3), the message body 312 of the secondary message 311 includes a reference 313 to the primary message 301. Further to sending the message 311; the respective mail server recycles the message 301 by retrieving a copy thereof from the repository 202 and inserting it into the message 311, thus yielding a message similar to message 306, which is further transmitted to C's mail server. Upon receiving the message, C is unable to distinguish whether B composed a message similar to message 306 or message 311.

The secondary message 314 shown in FIG. 3D conveyed from B to C is another example of a secondary message corresponding to the primary message 301, according to yet another embodiment of the invention. Like the previous secondary messages 306 and 311, the secondary message 314 also includes a message header 307 and a message body 315, wherein the message header is substantially similar to those of the secondary messages 306 and 311. Yet, the size of message body 315 is between that of the message 306 and that of the message 311. It is noted that the text of the message body 315 resembles that of the message body 308 of message 306, although the size is smaller because a reference 317 to the video file 305 is included therein, instead of the file itself that is included in the message 306. Appreciating that in most cases a reference should be smaller than the file referred to thereby, it should be understood that the message 314 is smaller in size than the message 306. When the source mail server of the message 314 receives the message, file 305 is recycled by retrieving the file 305 from the repository, inserting it into the secondary message 314, replacing the reference therewith, and transmitting the message to C. Typically, replacing the reference by the complete content results in deletion of the reference. But actual deletion of the reference is optional, particularly in cases in which the reference is transparent to the end-user. In either case, the referencing electronic mail message is augmented with the respective copy of the accompanying data relating to each reference, thereby reconstituting the non-referencing electronic mail message. Alternatively, instead of including a reference to the file 305, thereby requiring the mail server to identify the file without any reference to the primary message, the reference 317 can include references to both the primary message 306 and the file 305, thus allowing the message 306 to be retrieved from the repository and allowing the attachment 305 to be extracted therefrom, whereupon it can be merged with the secondary message 314.

Generally, the secondary messages 306, 311, and 314, as well as others which similarly appear to the receiver, are referred to hereinafter as "equivalent" messages. The message that includes the complete information (such as message 306) is referred to, hereinafter, as a "complete message" or, as noted above, a "non-referencing message." An equivalent message that is typically smaller in size as a result of including a reference to one or more parts of the complete message (e.g., a reference to the primary message, a reference to one or more attached files, etc.) is referred to hereinafter as a "referencing message," as noted above.

It is noted that the example illustrated in FIG. 3A is non-limiting and different embodiments are allowed as well, such as the embodiment shown in FIG. 3C, including a reference to the primary message 306 and to the attached file 305. In addition, the example provided describes recycling of a video file 305. However, the invention is not limited to files including video films. Moreover, the invention is not limited to messages having only one attachment. Alternative primary messages can include two attached files, three attached files, or any other number of files attached thereto. Furthermore, recycled content, i.e., accompanying data, can also include other types of information apart from attached files, such as formatting. A secondary message can include attachments that are not part of the primary message and it is not limited to be a forwarded message. For example, the secondary message may be a reply.

According to another, non-limiting example, accompanying data can include formatting information. It will be appreciated that formatting information includes information such as fonts, and/or size and/or color etc. Sometimes, the primary message is sent from a visual email interface, allowing the addition of formatting information to the message. This primary message's editor, for example, can emphasize a certain sentence using bold fonts, while other sentences can be emphasized using yellow-highlighted text. However, the primary message's editor cannot predict the type of email interface used by the message's receiver for reading this message. It is possible that the primary message's receiver will read the message using a non-graphical interface, such as a non-visual email interface operating on a terminal, or an email reading/editing application operating on a wireless device, such as many existing PDAs, mobile telephones, and RIM's BlackBerry® wireless platform.

Upon reading the primary message using a non-graphical interface, it will be appreciated that formatting information is normally removed from the message. According to the example, the receiver will be able to see only a single font, having a single size and a single color. Then, if a secondary message corresponding to the primary message is forwarded further, or if a response is transmitted to the primary message's editor (in this latter case the response constitutes the secondary message), the secondary message normally includes no formatting information.

According to some embodiments of the invention, by considering formatting information as accompanying data and by storing this data in the repository 202, the formatting information can be re-added to the secondary message upon transmitting it towards its destination, and hence the receiver of this secondary message will receive the secondary message with formatting information despite being edited using a non-visual interface. It is noted though that formatting information will be added only to those parts of the secondary message which are taken from the primary message, similar to 309 in the example of FIG. 3B.

Yet, this is non-limiting and alternatives exist. For example, in RIM's BlackBerry service the formatting information can be removed from the message in the BlackBerry Enterprise Server™ (BES) before it is pushed to the BlackBerry device. Hence, it might be impossible to include references to the formatting information (and to alternative accompanying data) upon composing secondary messages. However, upon transmitting the secondary message, it is possible to compare the message with a locally stored copy of the primary message, hence inserting references before transmitting the message to the mail server.

Many other alternative examples of different kinds of accompanying data also exist, such as HTML tags etc., and therefore it should be appreciated that the invention addresses accompanying data in general, whenever applicable, and it is not bound by the described examples of attached files and formatting information.

Although particular embodiments have been described with reference to FIGS. 3A-3D in which the composer of the secondary message B determines the format of the message and its content (e.g., he determines whether the secondary message is of the form depicted as 306, 311 or 314), this is not mandatory. For example, in another embodiment, B can compose a message that appears to be similar to 306, that is, a complete (i.e. non-referencing) message, including the complete direct content of the primary message. Yet, upon transmitting the message to its destination, C, or upon providing an explicit command, the email client can automatically construct a referencing message equivalent thereto, such as message 311 or 314.

Figure 4:
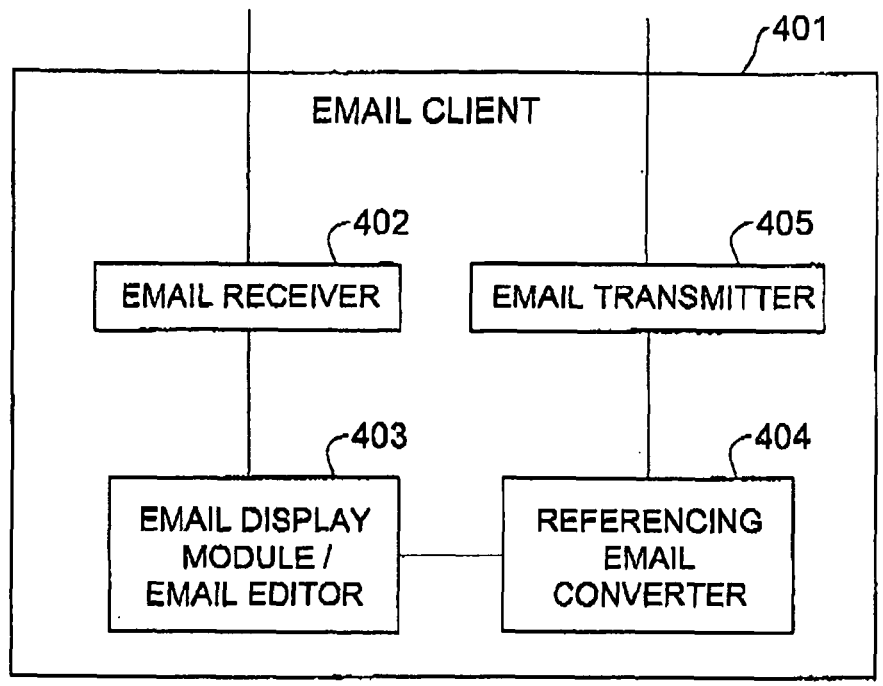
FIG. 4 is a block diagram illustrating an email client in accordance with an exemplary embodiment of the invention.

FIG. 4 is a block diagram illustrating an email client 401 in accordance with an embodiment of the invention. The email client 401 includes an email receiver 402 configured to receive email messages from a mail server. Received messages are then displayed on an email display module 403, which in many cases is also configured to allow editing of email messages (including secondary messages). In another embodiment, the email display module and the email editor are separate. The email display module/email editor is coupled to a referencing email converter 404, configured to construct a referencing message equivalent to the complete message constructed in the email editor. The referencing email converter 404 is further coupled to an email transmitter 405 configured to transmit email messages to a respective mail server, which may be identical to or different from the mail server of the email receiver 402.

The embodiment of FIG. 4 is non-limiting and other embodiments are also feasible. For example, the referencing email converter 404 can be directly coupled to the email editor without direct coupling to the email transmitter 405. It is considered that in this case the email converter 404 is activated to generate a referencing message in the email editor or in a storage device (such as memory) of the email editor, and then the email editor conveys the stored referencing message to the email transmitter 405. This is unlike other embodiments, such as the one illustrated in FIG. 4 wherein the referencing email converter 404 is directly coupled to the email transmitter 405 and to the email editor 403, in which case the referencing email converter 404 is able to convert a complete message to a referencing message upon transmittal, i.e., upon conveying it to the email transmitter 405. According to yet another embodiment the referencing email converter 404 can be directly coupled to the email transmitter without direct coupling to the email editor 403, thus allowing conversion of complete messages to referencing messages upon transmittal to the mail server. Hence, generally, the referencing email converter 404 can be directly or indirectly coupled to the email editor 403, as it can be directly or indirectly coupled to the email transmitter 405. Yet, other embodiments are also allowed. For example, in one embodiment there can be a single module functioning as both the email receiver 402 and email transmitter 405. In yet another embodiment, the email editor 403 can include an email receiver 402 and/or an email transmitter 405.

It is noted though that in different embodiments the functionality of the block diagram shown in FIG. 4 is not necessarily implemented in the email client 401. For example, the same functionality can be implemented in gateways, such as RIM's BlackBerry Enterprise Server™ (BES), as was previously noted.

One way for automatically constructing such a referencing message equivalent to a complete message is by applying a known per-se "diff" utility to the complete and primary messages. According to the embodiment previously described with reference to FIG. 4, this can be done, e.g., in the referencing email converter 404. Reverting to the example of FIG. 3, it can be illustrated that by applying a diff utility to the primary message 301 and to the complete secondary message 306, a structure that resembles the referencing message 311 would be constructed. The constructed structure can be used as a skeleton, into which it is possible to embed, or insert a reference to the primary message 301, thus yielding the referencing message 311.

The reference can be any unique identifier recognized by the secondary message's composer as well as by the secondary message's source mail server, such as the data (referred to as "message id") stored in the Message-ID field of the primary message's header. Upon receiving the referencing secondary message, the respective source mail server will be able to retrieve the primary message from the repository, using this reference (i.e., the message id). Alternatively, upon transmitting a primary message to the respective destination (i.e., upon storing the message in its receiver's inbox) and storing a copy thereof in the repository, the primary message's target mail server can provide an identification data thereto (e.g., a unique number or string, or even a hyperlink to a message stored in the repository), and store this data in an agreed format in the message or in association therewith, such as storing it in the Message-ID header field, or as a comment in the message header, or in association with a predetermined tag in the message body, etc. See, for example, JP 2005-284955 and WO 0178334, both of which add references to the messages to a mail message. Upon reading a primary message and constructing a secondary message respective thereto, the referencing email converter 404 can retrieve the identification data from the primary message and use it in the secondary message construction.

Figure 5:
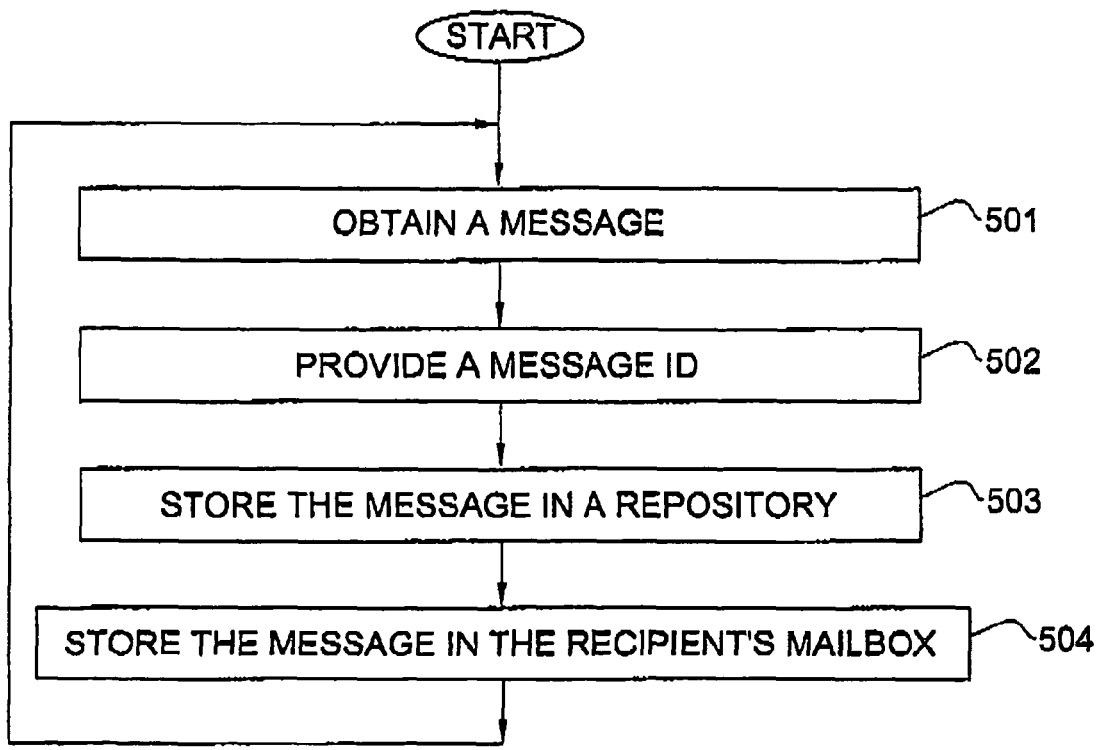
FIG. 5 is a flow chart illustrating the procedures in transmitting a primary mail message to the respective recipient's mailbox in accordance with an exemplary embodiment of the invention.

FIG. 5 is a flow chart illustrating the procedures in transmitting a primary mail message to the respective recipient's mailbox, in accordance with one embodiment of the invention. It is noted that the described procedures can be taken, for example, by the local MDA 1B04 or by any other processor in the target mail server 1A04. Upon obtaining a primary mail message, at 501, the local MDA 1B04 provides a message ID (i.e., message identification) thereto at 502. If the data stored in the Message-ID header field is to be used as a message ID, then the local MDA verifies that the primary message's header includes such a Message-ID and if not, a locally generated message ID data is stored therein. Otherwise, upon using other data as a message ID, the message ID is provided and stored in association with the message in any applicable method and format. For example, the repository managing module 201 can generate message ID data that identifies the message's copy stored in the repository, wherein the message ID data can be used by the local MDA 1B04 as a message ID. Then, at 503 the primary message is stored in the repository 202 and at 504 it is further stored in the recipient's mailbox 1B05. It is appreciated that in those cases when the message ID is generated by the repository managing module 201 it is most probable that the message's copy is stored in the repository (see 503) before providing a message ID to the message (see 502), hence the flow chart of FIG. 5 is non-limiting and alternatives are feasible. According to another example, wherein it is ascertained that a primary message must have a Message-ID, step 502 can be skipped. Alternatively, in another embodiment, the message can be stored, for example, in the recipient's mailbox prior or in parallel to storing it in the repository.

It was noted before that other embodiments exist, wherein a message copy is stored in the repository upon reading the email message (i.e., upon accessing the message stored in the mailbox), rather than upon receiving it (i.e., upon storing it in the mailbox). In such embodiments, the flow chart of FIG. 5 can be utilized while reading mail messages rather than upon receiving them.

Figure 6:
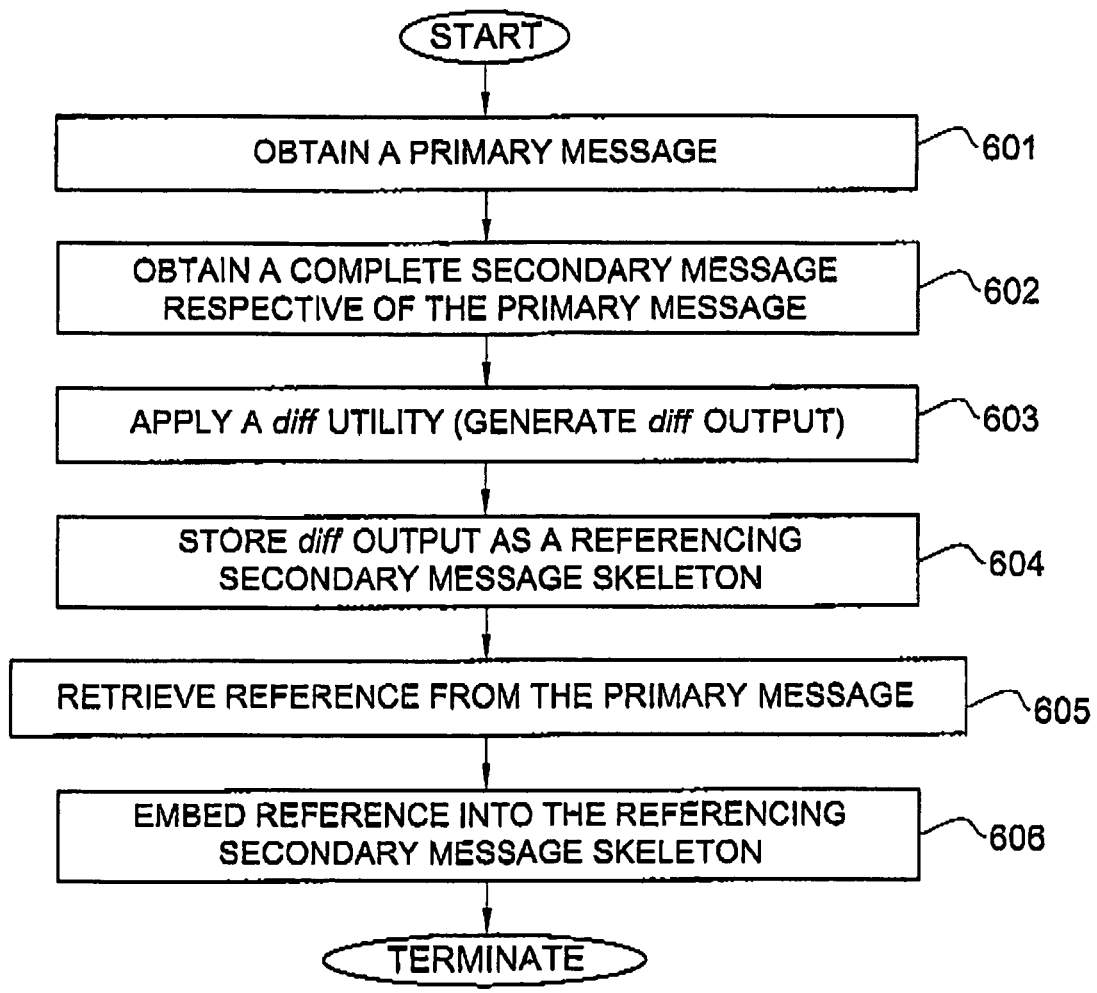
FIG. 6 is a flow chart illustrating the procedures taken while constructing a referencing message in accordance with an exemplary embodiment of the invention.

FIG. 6 is a flow chart illustrating the procedures taken while constructing a referencing message in accordance with one embodiment of the invention. It is noted that the described procedures can be taken, for example, by the referencing email converter 404 or by any other processor in the email client. Further to obtaining a primary message and the respective complete secondary message (see 601 and 602), the referencing email converter operating in accordance with the embodiment utilizes and applies a known per se diff utility 603, such as the UNIX diff tool. It is appreciated that the output of the diff utility, normally indicative of those parts of the secondary email which is different than the content of the primary email, includes those sections added to the secondary message. For example, the diff utility would be applied to the primary message 301 and to the complete secondary message 306 shown in FIG. 3B, while the output thereof includes the message header 307, the new text 309 that B writes to C and the delimiter "----- Original Message -----".

Continuing with FIG. 6, in step 604 the output is stored in a storage device to form a referencing secondary message skeleton, into which a reference to the primary message can be embedded, thus forming the referencing secondary message equivalent to the complete secondary message obtained in step 602. It should be appreciated that the storage device can be a short term memory, such as RAM or a long term device such as a hard disk, allowing further processing of the referencing secondary message skeleton, while constructing the referencing secondary message.

Furthermore, at step 605 the email converter extracts the message ID from the primary message, and at step 606 the message ID is embedded into the secondary message skeleton as a reference to the primary message. It is noted that embedding the message ID into the skeleton can include, for example, embedding a "reference tag" or a "recycling command" therewith, thus indicating to the mail server (or to any module operating therein) that this is a reference that should be replaced with a recycled primary message. Further to embedding the message ID, the secondary message skeleton becomes the referencing secondary message, such as the message 311, illustrated in FIG. 3. The referencing secondary message can be conveyed or transmitted to the mail server in order to transmit it toward its destination.

Figure 7:
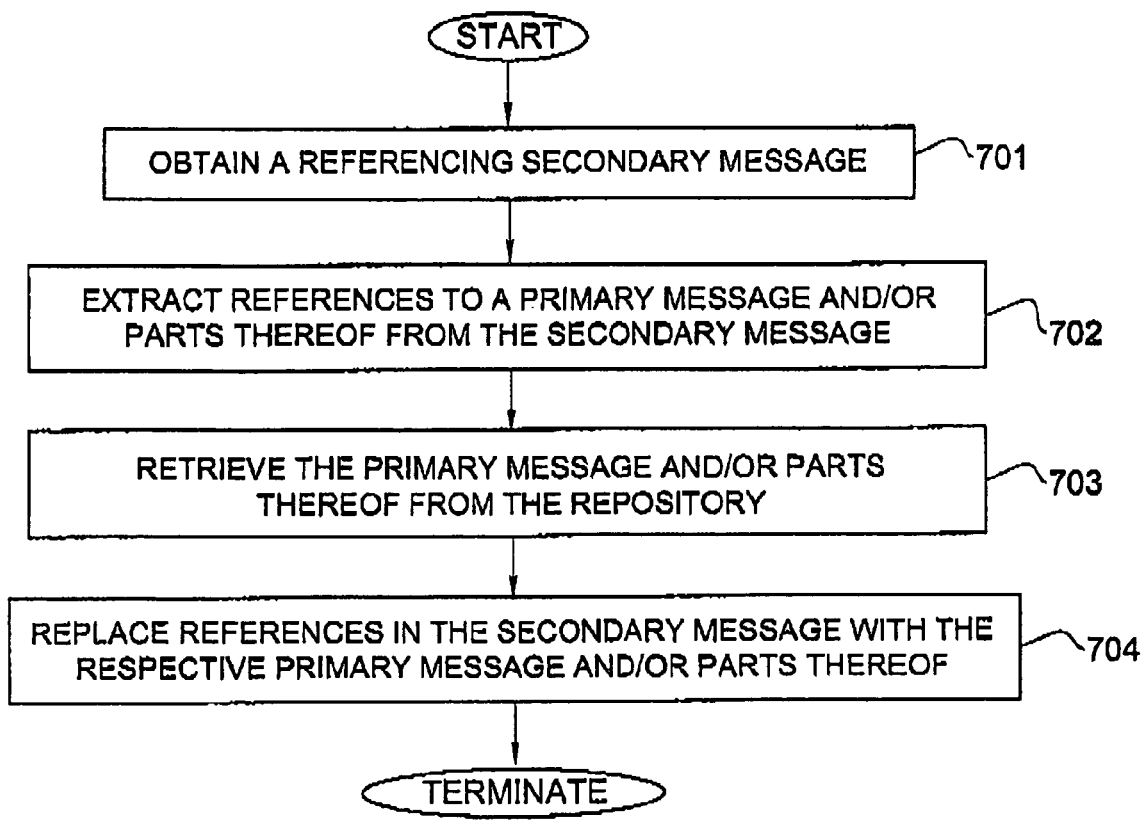
FIG. 7 is a flow chart illustrating the procedures taken by a mail server while receiving a referencing secondary message in accordance with an exemplary embodiment of the invention.

FIG. 7 is a flow chart illustrating the procedures taken by a mail server (or by any module operating therein) while receiving a referencing secondary message in accordance with one embodiment of the invention. It should be appreciated that in order to construct a complete secondary message based on a referencing secondary message, the mail server has to perform operations which are the reverse of those taken by the referencing email converter when constructing the referencing message. As the referencing secondary message includes a reference to the primary message, the mail server can extract (702) the reference therefrom, retrieving (703) a copy of the primary message from the repository. Further to retrieving the primary message from the repository, the mail server can replace (704) the reference included in the referencing secondary message with the content of the primary message, thus yielding a complete secondary message, equivalent to the referencing secondary message obtained on 701. The complete secondary message can then be further transmitted towards its destination.

Further to considering the examples illustrated in the flow charts of FIGS. 5, 6, and 7, it should be considered that these flowcharts describe the procedures that can be taken in order to enable a receiver of a primary message to construct and transmit referencing secondary messages corresponding thereto, wherein the simplest flow of operations taken by the receiver is (1) receiving the primary message; (2) constructing the complete secondary massage and the referencing secondary message; (3) conveying the referencing secondary message to the mail server (and to the referencing email converter); and only afterwards (4) deleting the primary message. It will be appreciated by those skilled in the art that upon deleting a primary message, it may also be deleted from the repository 202. Hence, if the receiver decides to operate in accordance with a different flow in which the primary message is deleted before the referencing secondary message is conveyed to the mail server (e.g., he can receive the primary message; construct the complete and referencing secondary messages; delete the primary message; and then convey the referencing secondary message to the mail server), it is possible that the mail server will be unable to reconstitute the complete secondary message in accordance with the referencing secondary message because it may be impossible to retrieve the copy of the primary message from the repository.

In accordance with one embodiment of the invention, therefore, when deleting a message from a receiver mailbox, the mail server keeps the copy thereof (if this exists) in the repository. However, if messages are not deleted from the repository, an overflow may occur. Hence, the content of the repository should be managed in order to allow storing therein messages for long enough time intervals allowing safe conversion of referencing secondary messages to complete secondary messages, but preventing overflow situations. According to this embodiment, it is the repository managing module 201 that can apply the managing scheme.

According to one example managing scheme, a copy of a message can be stored in the repository for a predetermined time interval further to the message's deletion. According to a different example managing scheme, instead of defining a predetermined time interval, the repository managing module can compute the time interval based on statistical information, such as the longest time it has taken so far (e.g., since reboot or since installation of the mail server etc.) for the mail server to reproduce a complete secondary message based on a referencing secondary message. According to yet anther embodiment, the longest time mentioned previously can be further affected by a certain factor such as a predetermined constant factor. According to yet another managing scheme, upon constructing a complete secondary message in an email client, a message is sent to the server, and hence to the repository managing module. This message is used as an indication that a copy of the primary message is required for future reconstitution of a complete secondary message corresponding thereto. As long as the indication exists, the repository managing module will avoid deleting the copy of the primary message from the repository. However, subsequent to the reconstitution of the complete secondary message the indication can be deleted, thus allowing the repository managing module to delete the copy of the message from the repository.

According to another embodiment of the invention, upon failing to retrieve a copy of a primary message from the repository, and hence failing to reconstitute a complete secondary message, the mail server can convey an indication to the email client that the complete secondary message cannot be reconstituted, hence requesting the email client to convey thereto the complete secondary message instead of the referencing secondary message. In order to allow such an embodiment, the email client needs to retain a copy of the complete secondary message until it is determined that no reconstitution failure message will be received. One embodiment for so doing is to provide an acknowledging message ("ACK") whenever the email client conveys a referencing secondary message to the mail server. The ACK is used as indication that the reconstitution of the complete secondary message has succeeded, and that the email client can safely delete the copy of the complete secondary message. If the reconstitution fails, the failure indication (used as "NACK") is conveyed to the email client as previously mentioned.

In the email client, upon obtaining an ACK, the copy of the complete secondary message can be deleted safely, as it will then be appreciated that the reconstitution was successfully performed. Alternatively, upon obtaining a NACK, indicating that the reconstitution has failed, the email client can convey the copy of the complete secondary message. However, this is non-limiting and ACK and NACK indications can also be used in other embodiments that do not retain copies of the complete secondary messages. For example, there are email clients that store outgoing messages in an "Outbox" folder, and after transmittal thereof the messages are moved to a "Sent Items" folder. Such an email client can use the ACK and NACK indications for indicating if and when to move the outgoing secondary message from the Outbox to the Sent Items folder, wherein it is possible to store a copy of the referencing message. Yet, if the email client's user selects to avoid storing messages in the Sent Items folder, the copy of the complete secondary message can be removed from the Outbox (and hence deleted) further to receiving an ACK, or further to conveying the copy of the complete secondary message to the email server.

It will also be understood that the system in accordance with embodiments of the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the appended claims.

What is claimed is:

1. A method comprising:
at an email server:
(a) obtaining a primary electronic mail message;
(b) obtaining a reference to accompanying data in the primary electronic mail message, wherein the reference allows reconstitution of the accompanying data from the primary electronic mail message, and wherein the accompanying data includes data selected from the group consisting of text, an attached file, a hypertext markup language (HTML) tag, and formatting information;
(c) storing the primary electronic mail message and the reference in a repository; and
(d) storing the primary electronic mail message in a mailbox of a first recipient;
at an email client:
(e) receiving, from a mail agent of the first recipient, a non-referencing secondary electronic mail message for a second recipient, wherein the non-referencing secondary electronic mail message includes the accompanying data of the primary electronic mail message;
(f) comparing the non-referencing secondary electronic mail message to the primary electronic mail message, thus yielding a difference;
(g) storing the difference in a referencing secondary message skeleton;
(h) retrieving the reference from the repository; and
(i) embedding the reference into the referencing secondary message skeleton, thus yielding a referencing secondary electronic mail message; and
at the email server:
(j) obtaining the referencing secondary electronic mail message;
(k) reading the reference from the referencing secondary electronic mail message;
(l) retrieving the accompanying data from the repository;
(m) replacing the reference in the referencing secondary electronic mail message with the accompanying data, thus yielding a reconstituted secondary electronic mail message; and
(n) transmitting the reconstituted secondary electronic mail message to a server for the second recipient.

2. The method of claim 1, further comprising the email client storing a copy of the non-referencing secondary electronic mail message.

3. The method of claim 1, further comprising the email client conveying to the email client, the referencing secondary electronic mail message, and obtaining, from the email server, an acknowledgment message or a failure indication.

4. The method of claim 3, further comprising the email client conveying a copy of the non-referencing secondary electronic mail message to the email server upon obtaining the acknowledgment message or a failure indication.

5. The method of claim 4, further comprising the email client deleting the copy of the non-referencing secondary electronic mail message after conveying the referencing secondary electronic mail message.

6. The method of claim 4, further comprising the email client deleting the copy of the non-referencing secondary electronic mail message after obtaining the acknowledgment message.

7. A computer readable memory device having recorded thereon instructions executable by processing, the instructions for performing a method comprising:
at an email server:
(a) obtaining a primary electronic mail message;
(b) obtaining a reference to accompanying data in the primary electronic mail message, wherein the reference allows reconstitution of the accompanying data from the primary electronic mail message, and wherein the accompanying data includes data selected from the group consisting of text, an attached file, a hypertext markup language (HTML) tag, and formatting information;
(c) storing the primary electronic mail message and the reference in a repository; and
(d) storing the primary electronic mail message in a mailbox of a first recipient;
at an email client:
(e) receiving, from a mail agent of the first recipient, a non-referencing secondary electronic mail message for a second recipient, wherein the non-referencing secondary electronic mail message includes the accompanying data of the primary electronic mail message;
(f) comparing the non-referencing secondary electronic mail message to the primary electronic mail message, thus yielding a difference;
(g) storing the difference in a referencing secondary message skeleton;
(h) retrieving the reference from the repository; and
(i) embedding the reference into the referencing secondary message skeleton, thus yielding a referencing secondary electronic mail message; and
at the email server:
(j) obtaining the referencing secondary electronic mail message;
(k) reading the reference from the referencing secondary electronic mail message;
(l) retrieving the accompanying data from the repository;
(m) replacing the reference in the referencing secondary electronic mail message with the accompanying data, thus yielding a reconstituted secondary electronic mail message; and
(n) transmitting the reconstituted secondary electronic mail message to a server for the second recipient.

8. A system comprising;
an email server for:
(a) obtaining a primary electronic mail message;
(b) obtaining a reference to accompanying data in the primary electronic mail message, wherein the reference allows reconstitution of the accompanying data from the primary electronic mail message, and wherein the accompanying data includes data selected from the group consisting of text, an attached file, a hypertext markup language (HTML) tag, and formatting information;
(c) storing the primary electronic mail message and the reference in a repository; and
(d) storing the primary electronic mail message in a mailbox of a first recipient; and an email client for:
- (e) receiving, from a mail agent of the first recipient, a non-referencing secondary electronic mail message for a second recipient, wherein the non-referencing secondary electronic mail message includes the accompanying data of the primary electronic mail message;
- (f) comparing the non-referencing secondary electronic mail message to the primary electronic mail message, thus yielding a difference;
- (g) storing the difference in a referencing secondary message skeleton;
- (h) retrieving the reference from the repository; and
- (i) embedding the reference into the referencing secondary message skeleton, thus yielding a referencing secondary electronic mail message, wherein the email server is also for:
- (j) obtaining the referencing secondary electronic mail message;
- (k) reading the reference from the referencing secondary electronic mail message;
- (l) retrieving the accompanying data from the repository;
- (m) replacing the reference in the referencing secondary electronic mail message with the accompanying data, thus yielding a reconstituted secondary electronic mail message; and
- (n) transmitting the reconstituted secondary electronic mail message to a server for the second recipient.

* * * * *